Patented Nov. 2, 1937

2,097,634

UNITED STATES PATENT OFFICE 2,097,634

METHOD FOR THE PRODUCTION OF POROUS SILICA GEL

Jacques Malan and George Gordon Hannington Malan, Somerset West, Union of South Africa, assignors to Imperial Chemical Industries Limited, a corporation of Great Britain No Drawing. Application March 11, 1935, Serial No. 10,586. In Great Britain March 28, 1934

13 Claims. (Cl. 23—182)

Means are known whereby silica gel suitable for adsorbing gases or to serve as a carrier for contact catalysts may be prepared and numerous methods have been proposed for producing such silica gel.

We have invented a novel method of producing silica gel in a porous state according to which there are mixed an acid such as hydrochloric acid, a solution of a soluble silicate such as sodium silicate, and a solution of a sulphur compound from which elemental sulphur can be precipitated in the colloidal state, conditions being so arranged that colloidal sulphur is liberated first and thereafter colloidal silica is thrown out of solution, so that the colloidal sulphur is occluded within the silica jelly and is uniformly dispersed throughout the mixture. It is advantageous but not essential to add a peptizing colloid or colloidal dispersing agent to the mixture, and preferably prior to the addition of the solution of the sulphur compound, so as to counteract any tendency towards flocculation of the precipitated colloidal sulphur.

In this way it is possible to prepare a mixture containing upwards of 30% by weight of sulphur in the final dry sulphur-silica gel mixture.

The precipitated sulphur-silica gel is washed, filtered and ground to a paste. After moulding the paste into pieces of the desired form, the said pieces are dried and the sulphur is removed by heating and there is left an essentially pure silica gel of high porosity.

The material contains the ultramicroscopic pores characteristic of silica gel and larger pores due to the voids created by the removal of the colloidal sulphur. The final product is of a white chalky appearance, and under the microscope resembles the cellular structure of a thin section of potato.

In order to secure a product of the desired nature it is advisable to control with care the conditions under which the gel is formed.

Experiment has shown that the use of dilute solutions of hydrochloric acid and sodium silicate e. g. 10% solutions, may result in a relatively compact gel which is relatively unsatisfactory in that the final product, if wetted with water, undergoes physical disruption.

Similarly, if solutions of the strength which we prefer, i. e. such that the final hydrosol mixture prior to gelation contains in solution not less than 7.5 grams of silica per 100 millilitres, are allowed to interact at temperatures below 20° C., a like compact product is obtained, which is shattered on being moistened.

We find that hydrochloric acid of a strength above 20% and sodium silicate solution containing from 10 to 15 grammes of silicon dioxide per 100 millilitres and a concentrated solution of a sulphur compound, brought together at a temperature between 40° C. and 80° C. under the conditions hereinafter described, yield an ultimate product of high porosity (of low apparent density) which is stable to water, not being broken down when moistened.

We have found suitable sulphur compounds to be the soluble polysulphides such as calcium polysulphide. Under the conditions of the invention the amount of acid used in excess of that equivalent to the alkalinity of the sodium silicate is sufficient to decompose the polysulphide with the simultaneous liberation of colloidal sulphur, and the production of precipitated calcium silicate is thus avoided.

Other polysulphides may be employed such for example as the polysulphides of barium, strontium, magnesium, sodium or potassium. Other sulphur compounds which may be used are the soluble thiosulphates e. g. sodium or potassium thiosulphates or soluble salts of tri-, tetra- or penta-thionic acids.

The invention is illustrated in the following example which is to be understood as illustrative of one method of carrying out the principles of the invention which is, however, not limited to the exact details therein set forth.

To a vessel constructed of acid resisting material and provided with a stirrer, is added 10.0 litres of 20% hydrochloric acid previously warmed to about 50° C. To this acid is added gradually with vigorous stirring 21.6 litres of a solution of sodium silicate containing 14.25 grammes silicon dioxide and 7.12 grammes sodium oxide per 100 millilitres, the solution also being heated to between 50 and 70° C. When all the sodium silicate has been introduced, 4.05 litres of a concentrated solution of calcium polysulphide containing about 11.0% by weight calcium oxide and about 28% by weight polysulphide sulphur, also heated to the above range of temperature, is gradually added, preferably in the form of a spray, the mixture being vigorously stirred throughout. In order to promote the dispersion of the colloidal sulphur and counteract any tendency towards flocculation, a small quantity of a colloidal dispersing agent (peptizing colloid) is added to the mixture immediately before the addition of the calcium polysulphide solution is begun. We find 6 grammes of evaporated cellulose sulphite lye powder dissolved in 10 millilitres of water a suitable dispersing agent.

The addition of the calcium polysulphide solution should be completed in from 5 to 6 minutes and is accompanied by the evolution of a copious quantity of hydrogen sulphide gas which causes the mixture to foam.

When all the polysulphide solution has been added the mixture is of a creamy or grey colour.

Within one minute it sets to a firm, opaque jelly.

The jelly is allowed to stand for some hours. It is then granulated by being forced through a coarse screen or by other suitable means and covered with a solution of 3 per cent to 5 per cent hydrochloric acid. After being well mixed and allowed to stand for 15 minutes the greyish colour disappears due to solution of ferrous sulphide generally present in the polysulphide solution, leaving the gel of a pale cream colour.

The gel and the dilute acid in which it is suspended is now transferred to a filter, for example a frame filter press, and washed with water, preferably warm water, until the gel is substantially free from soluble chlorides.

The gel is now rendered as free as possible from adhering uncombined water, by the admission of compressed air to the filter press or by other suitable means, and removed to a suitable mill where it is worked to a smooth, stiff paste of the consistency of butter. In this state it can be moulded into pieces of the desired shape. We find it convenient to extrude it in the form of a tube which is cut into pieces of the appropriate size.

The moulded material (rings, truncated segments of tube or whatever form is selected) is dried preferably at a temperature of 100 to 110° C.

After drying, the moulded pieces are found to have undergone considerable contraction but the material is hard and compact.

It is then heated in an electric or other suitable furnace, the temperature gradually being raised to about 600° C. when the sulphur is volatilized and the organic matter (dispersing agent) is removed by combustion. The pieces of silica gel are now in the form of a highly porous material of considerable mechanical strength. They are removed from the furnace and, after cooling, are ready for use.

Material prepared in this manner does not undergo mechanical disruption when moistened with water or other liquids and is eminently suited for use as a carrier for contact catalysts or as an adsorbent.

Silica gel obtained according to this invention may be converted into platinized contact mass in any known manner. If it is desired to recover the platinum, the contact mass may be treated with aqua regia to dissolve the platinum. The silica gel is unimpaired by this treatment and can again be impregnated with platinum for further use as a catalyst carrier.

The invention is not limited to the above example. Other soluble silicates, e. g. the alkali metal silicates, such as potassium silicate, may be used instead of sodium silicate. Instead of hydrochloric acid other acids may be used such as the mineral acids e. g. sulphuric, phosphoric or nitric acid, or organic acids such as acetic acid.

As the colloidal dispersing agent employed in one form of the invention there may be used a liquid cellulose sulphite in the form of an evaporated powder or as a syrupy concentrated solution; for example the material known under the name Goulac is suitable. There may also be used water soluble gums such as gum arabic or gum tragacanth.

Alternatively it is possible to add with vigorous stirring previously prepared colloidal sulphur to the silicate-acid mixture before the full quantity of silicate solution has been added, i. e. while the mix is still a hydrosol, gelation taking place therafter upon addition of the requisite amount of the silicate solution to bring the mixture to neutrality.

We claim:—

1. A process of preparing a silica gel which includes the steps of forming a silicic acid hydrogel having particles of precipitated sulphur uniformly dispersed therein, drying the said gel and heating the same to a temperature sufficient to remove the sulphur.

2. A process of preparing a silica gel which includes the steps of reacting a soluble silicate, an acid, and a soluble sulphur compound adapted to be decomposed by the acid to precipitate elementary sulphur, allowing the silicic acid hydrosol so formed to set to a hydrogel containing distributed sulphur, drying the said gel and heating the same to a temperature sufficient to remove the sulphur.

3. A process of preparing hard, porous silica gel as claimed in claim 2 in which the concentrations of the solutions employed are such that the final mixture, at the time of gelation, contains not less than 7.5 grams of $SiO_2$ per 100 millilitres.

4. A process of preparing hard, porous silica gel as claimed in claim 2 in which the acid employed is hydrochloric acid, preferably a solution containing not less than 20% HCl by weight.

5. A process of preparing a silica gel which includes the steps of reacting a soluble silicate solution which contains not less than ten grams of $SiO_2$ per 100 milliliters of solution, hydrochloric acid containing not less than 20% HCl by weight, and a soluble sulphur compound adapted to be decomposed by the acid to precipitate elementary sulphur, allowing the silicic acid hydrosol so formed to set to a hydrogel containing distributed sulphur, drying the said gel and heating the same to a temperature sufficient to remove the sulphur.

6. A process as claimed in claim 1 in which the gel is formed at a temperature between 40° C. and 80° C.

7. A process as claimed in claim 2 in which the soluble sulphur compound is added in the form of a concentrated solution of a soluble polysulphide.

8. A process of preparing hard, porous silica gel consisting in mixing, with vigorous stirring, solutions of a soluble silicate and of an acid, adding thereto a solution of a soluble polysulphide, washing the resulting gel substantially free from soluble impurities, grinding the gel to a smooth paste, moulding the paste into pieces of the desired shape, drying the pieces of moulded gel and finally heating the moulded pieces of gel strongly to remove sulphur and organic matter.

9. A process of preparing hard, porous silica gel consisting in mixing, with vigorous stirring, solutions of a soluble silicate and of an acid, adding thereto a solution of a soluble polysulphide, washing the resulting gel substantially free from soluble impurities, and drying the gel at an elevated temperature preferably between 100° C. and 110° C.

10. A process of preparing hard, porous silica gel consisting in mixing, with vigorous stirring, solutions of a soluble silicate and of an acid, adding thereto a solution of a soluble polysulphide, allowing the resultant gel to stand for some hours, granulating the gel and washing it substantially free from soluble impurities, moulding the gel into pieces of the desired shape, drying the pieces of moulded gel and heating the same to remove sulphur and organic matter.

11. A process as claimed in claim 8 in which the temperature of heating is about 600° C.

12. A process of preparing a silica gel which includes the steps of forming a silicic acid hydrogel having particles of precipitated sulphur dispersed therein in the presence of a colloidal dispersing agent, drying the said gel and heating the same to a temperature sufficient to remove the sulphur and the organic matter.

13. A process of preparing a catalytic material which includes the steps of forming a silicic acid hydrogel having particles of precipitated sulphur uniformly dispersed therein, drying the said gel, heating the same to a temperature sufficient to remove the sulphur and impregnating the product with an active catalytic agent.

JACQUES MALAN.
GEORGE GORDON HANNINGTON MALAN.